(No Model.)
R. J. HOFFMAN.
LUBRICATOR ATTACHMENT.
No. 267,430. Patented Nov. 14, 1882.
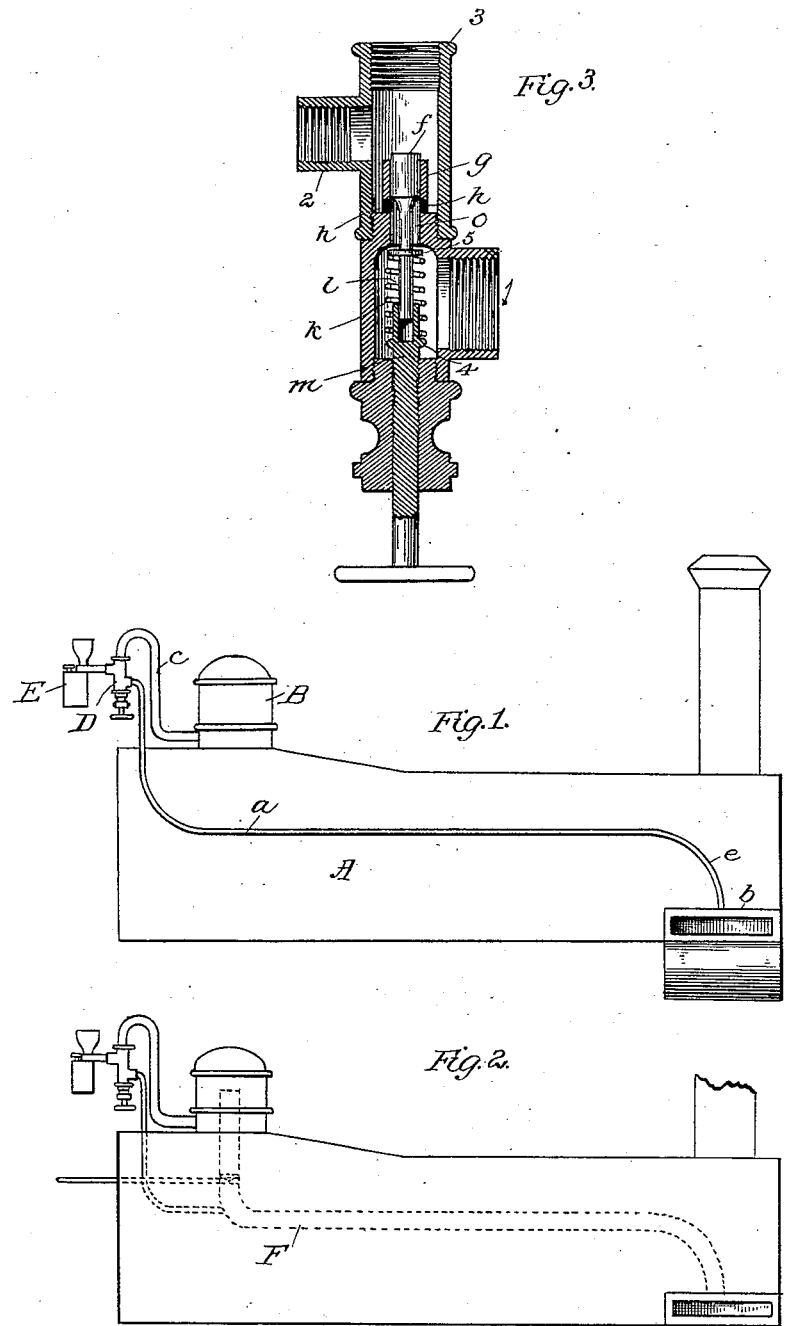
Attest:
Walter Donaldson
David A. Mead
Inventor
Ross J. Hoffman
by Ellis Spear
Atty

UNITED STATES PATENT OFFICE.

ROSS J. HOFFMAN, OF BINGHAMTON, NEW YORK.

LUBRICATOR ATTACHMENT.

SPECIFICATION forming part of Letters Patent No. 267,430, dated November 14, 1882.

Application filed September 2, 1882. (No model.)

*To all whom it may concern:*

Be it known that I, ROSS J. HOFFMAN, of Binghamton, in the county of Broome and State of New York, have invented a new and useful Improvement in Lubricator Attachments; and I do hereby declare that the following is a full, clear, and exact description of the same.

My invention relates to the automatic lubrication of locomotive-engines. Heretofore, so far as I am aware, it has been found impossible to apply practically to locomotive-engines the automatic feed-lubrication generally applied to stationary engines.
Locomotive-engines vary, as is well known, greatly and constantly in the steam-pressure. When going down grades steam is shut off wholly, and between this and the full head there are all intermediate degrees of pressure.
This great and perpetual variation prevents the use of the ordinary steam-feed. Hence it happens that when the steam is shut off the engine runs without that lubrication which the moisture of the steam supplies, and in consequence not only is the lubrication less uniform, but more oil is needed. To overcome this irregularity of steam-pressure and to produce a uniform and constant steam-feed of the lubricant are my objects in the invention herein set forth.

My invention consists principally of a constant steam-feed lubrication in connection with an engine subject to variable work.

It consists, further, of an automatic valve and an arrangement of steam-pipes in relation to the lubricator, the steam-boiler, and the cylinders, whereby the back-pressure of the steam in the cylinder is made to regulate the flow of steam which carries the lubricant to the working parts of the engine.

It consists, further, of details of construction, all as hereinafter described, and pointed out in the claims.

In the accompanying drawings, Figure 1 shows a side elevation of a locomotive-boiler with my apparatus attached. Fig. 2 shows a like view of such a boiler with a modified mode of application of the tubes. Fig. 3 is a central vertical section of the valves.
In the drawings, Fig. 1 represents the mode of application to a boiler such as those now in common use. In this the ordinary pipe, *a*, which conducts the oil from the ordinary cup to the cylinder, is made use of to conduct the oil or other lubricant. To the upper end of this pipe marked *a*, I attach my valve mechanism D. (Shown more clearly in Fig. 3.)

The valve-chamber has a short pipe, 1, for connection with the pipe *a*, extending longitudinally, and another short pipe, 2, on the opposite side, for connection with the lubricator-cup. A third pipe, 3, connects with the pipe *c*, leading to the dome of the boiler. Steam from the dome is conducted through this pipe, through pipe 3 to the lubricator-cup by pipe 2, and through ports *h h* to the cylinder through pipe *a*. These ports are constantly open to a greater or less degree, so that there is always some flow of steam from the dome to the valve chests and cylinders. The valve *f* works closely, fitting in a tubular case, *g*, in which are the ports *h h*. Its stem passes down through the passage *o* and extends into the socketed stem end of a supplemental stem, *m*, threaded through the solid end of the valve-chamber. Stem *l* is provided with a collar, 5, and supplemental stem *m* with a collar, 4. These collars include a spring, *k*, coiled about the stems, which spring is regulated in pressure by the supplemental stem, *m*, and tends constantly to lift the valve *f*. When the locomotive is still this valve is set for a certain amount of flow. The steam from the dome passes down around the tubular case *g* and through the ports *h h* to pipe *a*, meeting there with no resistance; but when steam is let into the cylinders the back-pressure checks the flow of steam from the dome. At the same time this back-pressure re-enforces the spring *k*, and both together overcome more or less the pressure of steam above the valve *f*, thereby lifting said valve and opening the ports *h h* wider, to facilitate the flow of steam from above and counteract the back-pressure. Manifestly the amount of back-pressure will lift the valve more or less as it varies, but always in exact proportion to its tendency to retard the flow of steam from above. In this way the steam-supply from the dome is regulated and kept uniform, and thereby a uniformly-regulated supply of oil is obtained mixed with steam, and carried thereby under all circumstances.

I may use on the pipe 2 my improved automatic lubricator described in Letters Patent granted me on the 2d day of May, 1882; but other forms of lubricator-cup may be used instead.

In applying my apparatus to new locomotives I may dispense with the outside pipe, a 2, and use the arrangement shown in Fig. 2. In this arrangement I carry the pipe into the dry-steam pipe F beneath the throttle-valve, thus shunting this pipe and dispensing with the outside pipe, a.

I do not confine myself to the precise form of valve shown, as this may be varied, it being only essential that the valve should be so arranged as to receive the pressure of steam carrying the lubricant, and that the back-pressure of steam from the cylinders should re-enforce a constant force acting underneath the valve against the pressure of the steam from the dome which supplies the lubricant.

I have shown only one pipe to the cylinder; but obviously they are the same on both sides.

The same apparatus may be applied with like effect to engines in mines and other places where there is a great variety of back power.

Having thus described my invention, what I claim is—

1. In connection with the boiler and steam-cylinder of the class described, an automatic lubricator-cup connected to a valve-chamber above the valve thereof, a pipe connecting said valve-chamber above the valve with the interior of the boiler, a valve having ports constantly open, as described, for the passage of a small escape of the steam, means for giving a constant pressure underneath the said valve, and a steam-pipe connecting the valve-chamber below the valve to the interior of the cylinder, substantially as described.

2. The combination of the lubricator-cup E, valve mechanism D, having valve and ports $h$ $h$ constantly open to some extent, variable mechanism for pressing said valve upward, pipe $c$, leading to the interior of the dome or boiler, and pipe $a$, leading to connection with the cylinder, substantially as described.

3. In connection with a boiler and cylinders of a locomotive, a steam-supply pipe leading from the dome and connected with the cylinders, a suitable automatic lubricator, valve-chamber, and valve between the lubricator and the cylinders, ports allowing a constant flow of steam in limited quantity from the valve to the cylinders, and means, substantially as described, whereby the back-pressure of the steam in the cylinders may lift the valve and increase the flow of steam, substantially as described.

4. In combination with the boiler and cylinder of a locomotive, a lubricator-cup, E, and a valve mechanism, D, consisting of a chamber having pipe-connections 1 2 3, and valve $f$, having telescoping stems $l$ and $m$, collars 4 and 5, and spring $k$, and ports $h$ $h$, the said valve mechanism and lubricator being connected to each other, to the steam-cylinder, and to the boiler by pipe-connections, as described, whereby the steam from the boiler is constantly supplied in limited quantity to the cylinder and the supply of steam varied, all as set forth.

In testimony whereof I have signed my name to this specification in the presence of two subscribing witnesses.

ROSS J. HOFFMAN.

Witnesses:
   FRANK L. MIDDLETON,
   WALTER DONALDSON.